(No Model.)

H. R. COLLINS.
TIRE.

No. 590,201. Patented Sept. 14, 1897.

United States Patent Office.

HARRY R. COLLINS, OF SOUTH BETHLEHEM, PENNSYLVANIA.

TIRE.

SPECIFICATION forming part of Letters Patent No. 590,201, dated September 14, 1897.

Application filed June 23, 1897. Serial No. 641,959. (No model.)

*To all whom it may concern:*

Be it known that I, HARRY R. COLLINS, a citizen of the United States, residing at South Bethlehem, in the county of Northampton and State of Pennsylvania, have invented certain new and useful Improvements in Tires; and I do hereby declare the following to be a full, clear, and exact description of the invention, such as will enable others skilled in the art to which it appertains to make and use the same.

My invention relates to tires for vehicle-wheels, but more particularly to cushion-tires.

The main objects of the invention are to provide a cushion-tire of novel construction designed to secure the advantages of a pneumatic tire without being subject to the disadvantages of such tires in practical use and to provide a means or method of attachment of the tire to the rim or felly whereby a self-securing action thereof in use is obtained and whereby any pressure to which the tire is subjected in use may tend to more firmly bind the tire to the rim or felly and prevent displacement thereof.

A further object of the invention is to provide an improved rim or felly adapted to afford a broad base or support for the tire and to coöperate therewith in securing the tire thereto without rendering it necessary to use cement or other fastening means to hold the tire and rim together.

The invention consists essentially, first, in a cushion-tire of peculiar construction adapted to operate after the manner of and to secure the advantages of a pneumatic tire and having means thereon adapted to coact with means on the felly or rim whereby the two parts are locked together, so as to prevent separation thereof in use, and, secondly, the invention consists of a rim or felly of peculiar construction adapted for the attachment thereto of the aforesaid cushion-tire by coacting securing means carried by the tire and rim.

The invention will first be hereinafter more particularly described with reference to the accompanying drawings, which form a part of this specification, and then pointed out in the claims at the end of the description.

Figure 1:
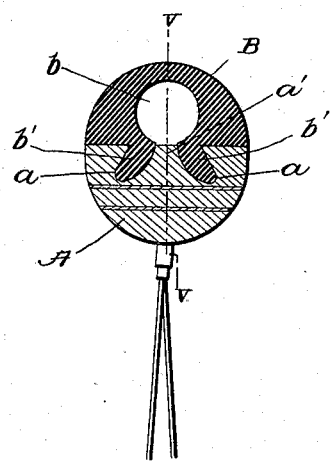
Figure 2:
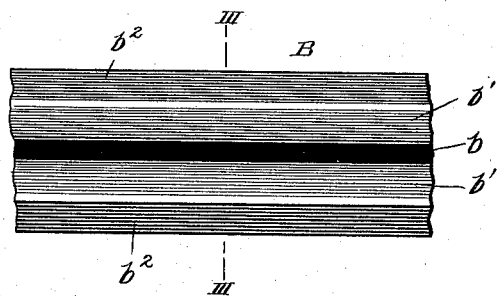
Figure 4:
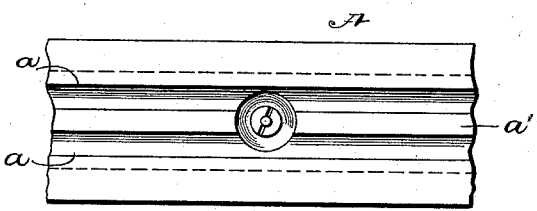
Figure 3:
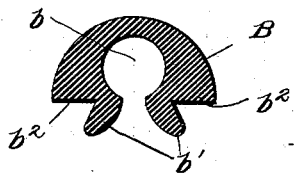
Figure 5:
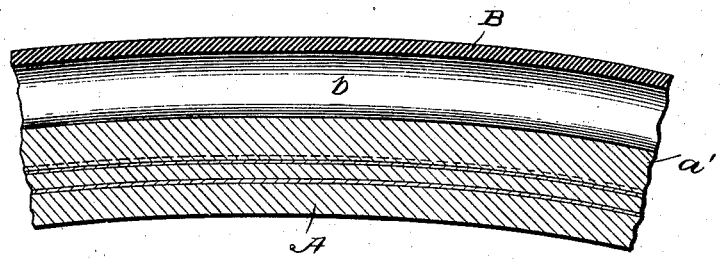

In the drawings, Figure 1 is a cross-section of the wheel rim or felly and the tire secured thereto. Fig. 2 is a detail inverted plan view of a broken-away portion of the tire. Fig. 3 is a cross-section of the tire on the line III III of Fig. 2. Fig. 4 is a plan view of a broken-away portion of the rim or felly. Fig. 5 is a vertical longitudinal sectional view of a portion of the rim and tire, said section being taken on the line V V of Fig. 1.

A denotes the rim of the wheel, which is preferably composed of alternate layers of wood of different degrees of strength and fiber with intervening courses of cement. Three layers of wood are shown, but any desired number of layers may be employed, or the rim may be of any of the forms in common use, except as to the securing means, hereinafter described. In the top layer or surface of the rim, intermediate its edges, I provide or form parallel grooves $a$, which preferably encircle the rim, though they might be formed in sections. These grooves are constructed with an outward curve and are adapted to receive correspondingly-shaped ribs on the tire and to leave between them an annular or sectional rib $a'$ to prevent the ribs or flanges on the tire from coming out of the grooves when any lateral strain is put upon the tire in use. The rim may have the usual openings, in which sockets are embedded for receiving the ends of the spokes in the usual manner.

B denotes the tire, which is preferably of rubber and is formed with the central opening or bore $b$ extending circumferentially around the tire and with the obliquely-arranged fastening ribs or flanges $b'$, which may be continuous or sectional to correspond with the grooves in the rim and are adapted to fit in said grooves. These ribs or flanges $b'$ extend below the flat portion $b^2$ of the tire, which rests on the upper layer or surface of the rim, and they are curved in such manner as to correspond with the curves of the grooves, so that when the tire is in place on the rim these two parts may be interlocked and firmly secured together. I thus secure a firm fastening for the tire without necessitating the use of cement, though cement may be used, if desired, to bind the parts even more securely together, and any strain or pressure that is put upon the tire in ordinary use will only tend to more firmly secure the tire to the rim, and at the same time the construction of the tire is such as to give the effect which is produced by the use of a pneumatic tire, without the disadvantages due to puncturing and other objections to which pneumatic tires are subject in use.

Having thus fully described my invention, what I claim as new, and desire to secure by Letters Patent of the United States, is—

1. A vehicle-tire consisting of an elastic body or rim having a base portion provided with outwardly-inclined flanges or ribs on the inner surface thereof, and an annular centrally-disposed opening above said ribs, whereby the tire is adapted to be locked to a suitably-grooved rim and to afford a pneumatic effect without being subject to the defects and disadvantages of a pneumatic tire, substantially as described.

2. In a vehicle-wheel, the combination with the rim having outwardly-inclined circumferential grooves in the upper or outer surface thereof, and an intermediate circumferential rib having its sides bound by said grooves, of a cushion-tire consisting of an elastic body or ring having a base portion adapted to be seated upon said rim, and provided with ribs or flanges on its inner surface shaped to fit the grooves of the rim, and an annular opening extending therethrough above said ribs, whereby the two parts are adapted to be interlocked and secured together so as to prevent disconnection by pressure thereon in use while giving the effect of a pneumatic tire, substantially as described.

In testimony whereof I affix my signature in presence of two witnesses.

HARRY R. COLLINS.

Witnesses:
 CHAS. E. RIORDON,
 S. B. ARMAT.